United States Patent
Rice

[15] 3,703,807
[45] Nov. 28, 1972

[54] COMBINED GAS-STEAM TURBINE POWER PLANT

[72] Inventor: Ivan G. Rice, Spring, Tex.

[73] Assignee: De Laval Turbine Inc., Trenton, N.J.

[22] Filed: Jan. 15, 1971

[21] Appl. No.: 106,724

[52] U.S. Cl. .............................60/39.18 B, 60/39.24
[51] Int. Cl. ................................................F02c 7/08
[58] Field of Search .......60/39.51 R, 39.52, 39.18 A, 60/39.18 B, 92, 39.65, 39.24

[56] References Cited

UNITED STATES PATENTS

| | | |
|---|---|---|
| 2,758,979 | 8/1956 | Guthrie .....................60/39.52 |
| 3,374,621 | 3/1968 | Pacault et al..........60/39.18 B |
| 3,613,363 | 10/1971 | Jubb et al. .................60/39.52 |
| 2,986,882 | 6/1961 | Pavlecka ....................60/39.52 |
| 2,973,622 | 3/1961 | Netted ...................60/39.51 R |
| 2,621,475 | 12/1952 | Loy ...........................60/39.52 |
| 3,541,790 | 11/1970 | Kellett.......................60/39.52 |

Primary Examiner—Carlton R. Croyle
Assistant Examiner—Warren Olsen
Attorney—Smith, Harding, Earley & Follmer

[57] ABSTRACT

In a combined gas-steam turbine power plant, part-load heat rate is improved by recirculating the boiler stack gas into the air inlet of the turbine compressor section.

5 Claims, 3 Drawing Figures

PATENTED NOV 28 1972 3,703,807

INVENTOR
IVAN G. RICE

BY
Smith, Harding, Earley & Follmer
ATTORNEYS

COMBINED GAS-STEAM TURBINE POWER PLANT

BRIEF SUMMARY OF THE INVENTION

This invention relates to power plants, and particularly to the improvement of the part-load heat rate in a combined gas turbine-steam turbine power plant to effect a fuel saving.

The combined gas turbine-steam turbine power plant (or "combined cycle" power plant) is gaining popularity in the municipal and industrial markets as a profitable way to generate both electrical power and mechanical horsepower. In a typical installation, an electrical generator, process compressor, or other device requiring mechanical power is arranged to be driven by both a gas turbine and a steam turbine. The heat content of the gas turbine exhaust is used to generate steam for operation of the steam turbine. With varying load conditions, the steam turbine provides the primary variations in the generator driving power. Although the steam turbine and gas turbine in a combined-cycle power plant usually drive the same load, it is not necessary that they do so. For example, in the case of a pipeline, the steam and gas turbines of the combined cycle power plant might be used to drive separate compressors.

The combined cycle for certain applications provides process steam at various pressure levels. This steam is extracted from the steam turbine or is taken directly from the boiler. The invention applies to combined cycles with or without process steam requirements. It also applies to combined cycles employing gas turbine exhaust process heaters, fired and non-fired.

The operating characteristic of a typical combined cycle power plant is such that the heat rate rapidly becomes prohibitively high as load is decreased under partial load conditions. Furthermore, this undesirable characteristic of the combined cycle power plant becomes more noticeable under low ambient temperature conditions. This is true even in the case of installations employing two-shaft gas turbines or single shaft units incorporating inlet chokes or variable inlet guide vanes.

Under low ambient temperature conditions, a further problem arises because of the tendency of turbine compressor inlet air filters to freeze.

U.S. Pat. No. 3,150,487 to J. L. Mangan et al. issued Sept. 29, 1964, discloses a combined cycle power plant in which air entering the turbine compressor section is heated in order to improve part-load efficiency. In the Mangan patent, heating of the air entering compressor section is accomplished in one of three ways. In one instance, a heat exchanger is used which operates from the flow of liquid in the steam turbine condenser. In another instance, the gas turbine exhaust is diverted to the compressor inlet. In a third instance, part of the steam from the boiler is diverted to a heat exchanger, which heats the air entering the compressor section. All three of these systems are described as capable of accomplishing heat rate reductions under partial load conditions.

The efficiency of a combined cycle power plant is highest when the sum of the loss of heat through the condenser and the loss of heat through the stack is lowest. In accordance with this invention, part of the boiler stack gas is mixed with ambient air entering the gas turbine compressor section prior to filtration. This results in a reduction of the loss of heat through the stack thereby increasing the efficiency of the power plant. The invention is capable of operating at a greater efficiency than any of the three systems of Mangan, et al. It produces improved fuel savings because the direct use of boiler stack gas takes advantage of heat which would be otherwise dissipated to the atmosphere. It makes use of the most direct practical and simple way to improve part-load heat rate. The system does not affect steam generation or stem turbine output. No heat exchange apparatus is required to heat the air entering the compressor. The system permits the recirculation of the maximum amount of heat. The air entering the gas turbine compressor, acting as a heat sink, can absorb as much heat from the stack gas as permitted by the compressor design, and inlet temperatures may be even as high as 160°F., for example.

In accordance with the invention, because the ambient air is heated before reaching the filter, no freezing can take place.

The boiler may be provided with supplementary firing apparatus. Stack gas can be recirculated to the compressor inlet, even when the supplementary firing apparatus is operated, since the stack gas will still be rich in oxygen, and will produce no substantial detrimental effect on combustion in the gas turbine. Natural gas is an ideal fuel for the gas turbine because of its clean combustion. It will not cause gas turbine compressor fouling.

Recirculation of stack gases in accordance with the invention also produces a reduction in thermal pollution.

The principal object of this invention is to provide a combined cycle power plant which operates at high efficiency under partial load conditions.

Another object is to provide a combined cycle power plant which is highly flexible with regard to its load range.

A further object is to provide a combined cycle power plant which is simple and which is reliable under low ambient temperature conditions, and which can be easily maintained.

Other objects will be apparent from the following description when read in conjunction with the drawings.

DESCRIPTION OF THE PREFERRED EMBODIMENT

Figure 1:
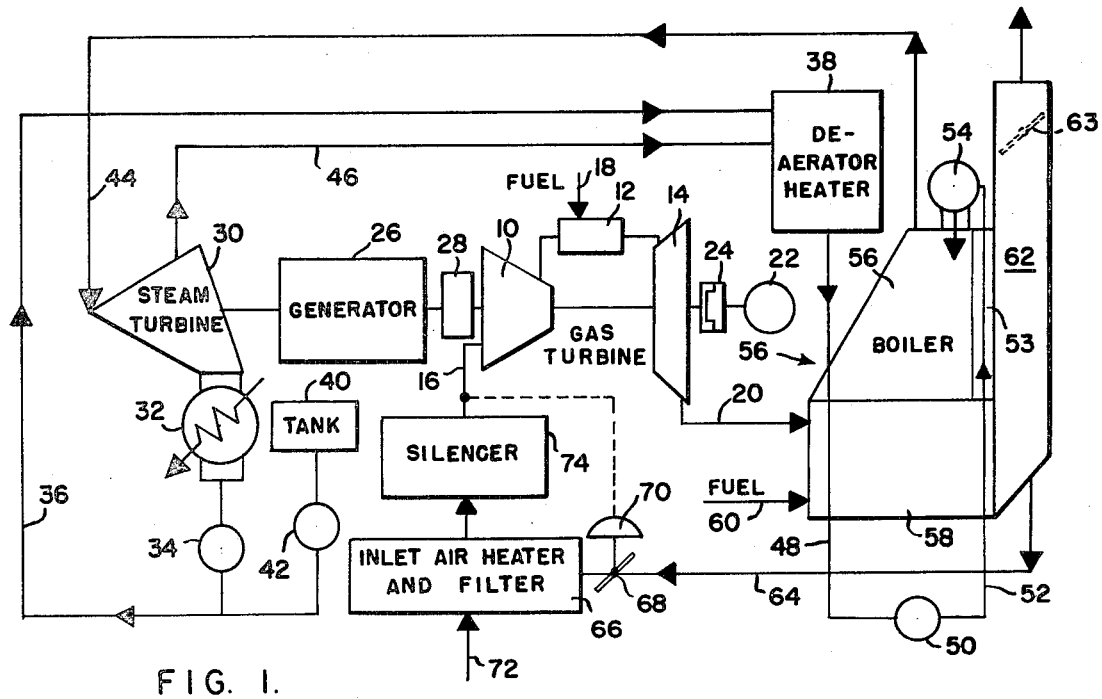
FIG. 1 is a schematic diagram of a combined gas turbine-steam turbine power plant in accordance with the invention.

FIG. 1 shows a gas turbine comprising, in series, a compressor section 10, a combustion chamber 12, and a turbine section 14. Air enters the compressor section through passage 16, and fuel enters the combustion chamber through passage 18. The turbine exhaust passes through passage 20. An electric starter motor is indicated at 22, and is connected to the turbine shaft through clutch 24.

The turbine drives generator 26 through reduction gearing 28.

The generator is also driven by steam turbine 30. Steam turbine 30 is provided with a conventional condenser 32, which discharges condensate through a pump 34 to line 36, which carries the condensate to a conventional deaerator and heater 38. Water in the system can be replenished from tank 40 through pump 42.

Steam enters turbine 30 through line 44. Extracted steam is delivered through line 46 to the deaerator and heater 38.

Water discharged from the deaerator and heater is delivered through line 48 to boiler feed pump 50, from which it is delivered through line 52 to a conventional economizer 53 and then to a boiler drum 54, on top of a boiler indicated generally at 56. The economizer is employed in order to reduce the stack gas temperature by heating the feed water before it reaches the boiler drum.

The boiler comprises a water-containing section 56 and a section 58 which includes conventional heat-exchange apparatus for transferring the heat of the gas turbine exhaust to the water and conventional supplementary firing apparatus receiving fuel through line 60. The supplementary firing apparatus is not essential, and stack gas recirculation improves part-load heat rate whether or not supplementary firing is employed. If supplementary firing apparatus is used, its exhaust may be discharged into the stack and recirculated along with the gas turbine exhaust.

A stack 62 receives the gas turbine exhaust after it passes through the heat exchange apparatus. A damper 63 in the stack is adjustable to produce a back-pressure causing at least part of the stack gases to be delivered to the gas turbine compressor section as explained below.

Stack 62 normally discharges the exhaust gases to the atmosphere, however, an additional line 64 connects the stack to an inlet air heater and filter 66 through a damper 68, controlled by a conventional adjustable temperature responsive control 70, coupled to the compressor inlet line 16.

The opening of damper 68 is continuously variable and depends on the temperature of the gas-air mixture entering the gas turbine compressor section through passage 16. As the temperature decreases the damper gradually opens until an equilibrium is reached determined by the setting of control 70.

The adjustable damper 63 allows a great deal of flexibility in the operation of the system and permits normal operation without recirculation as well as any desired degree of recirculation. Heater and filter 66 receives air through passage 72 and delivers combined air and exhaust gases through silencer 74 to passage 16.

Figure 2:
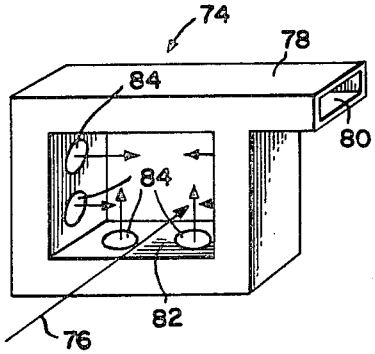
FIG. 2 is a perspective view of an inlet air heater in accordance with the invention.

FIG. 2 shows the inlet air heater section 74 of the inlet air heater and filter 66. Heater 74 precedes the filter in the direction of ambient air flow indicated by arrow 76. Heater 74 comprises a conduit 78 having an entrance opening at 80 and having a rectangular passage 82 through which ambient air flows toward the filter. Stack gases enter opening 80 from damper 68, pass through the conduit in both directions, and join the ambient air through openings 84, raising its temperature to the level set by adjustment of controller 70.

Figure 3:
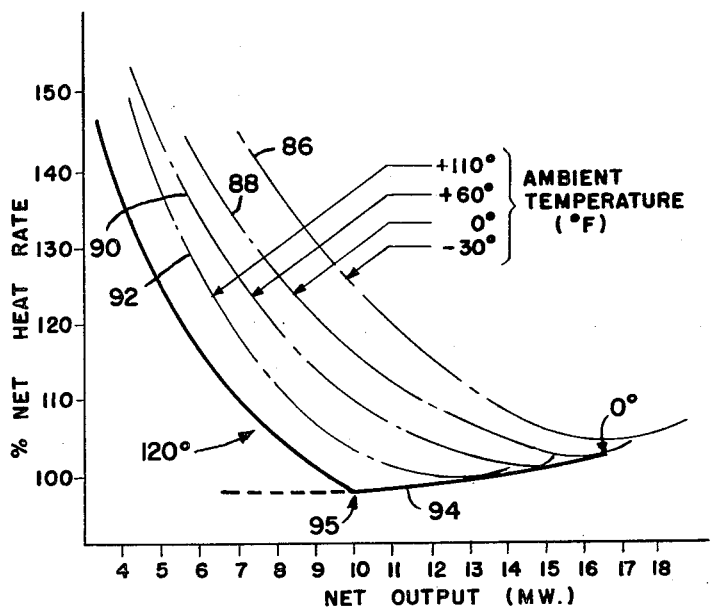
FIG. 3 is a set of curves in which heat rate is plotted against plant output power in a conventional combined cycle power plant in broken lines and in a power plant in accordance with the invention in solid lines.

FIG. 3 shows a set of performance curves of a conventional combined cycle power plant without recirculation for a number of different ambient temperatures (which are essentially the temperatures of air entering the compressor section of the gas turbine.) These curves are for a typical power plant having a design power output of 14.4 megawatts. Net heat rate is shown in percent net heat rate, and net power output is indicated in megawatts. Performances at −30°, 0°, +60°, and +110° Farenheit are shown respectively by curves 86, 88, 90, and 92. At the lower ambient temperatures, and under partial load conditions, it will be apparent that the combined cycle power plant without recirculation performs with comparatively low efficiency as a result of the higher heat loss through the boiler stack.

Curve 94 shows the typical performance of the same combined cycle power plant provided with stack gas recirculation means as shown in FIG. 1 for an ambient temperature of 0°F. Curve 94 represents an adjustment of controller 70 for the optimum compressor inlet temperature at each net output level within the range to the right of the discontinuity indicated at 95. In this range, it follows the locus of the minimum points of the set of curves including 86, 88, 90 and 92 for the combined cycle power plant without stack gas recirculation. The temperature varies from 0°F to 120°F along the part of the curve to the right of the discontinuity. The discontinuity occurs because the fully opened condition of damper 68 corresponds to a maximum compressor inlet temperature which can be reached at a particular setting of damper 63. This temperature is typically 120°, although it may be allowed to go higher if permitted by turbine design, in which case the discontinuity would move to the left along the extension of curve 94 shown as a broken line. The upwardly extending portion of curve 94, shown as a solid line to the left of the discontinuity 95, represents the performance of the system at still lower net output levels. The inlet temperature at these lower net output levels, however, remains at 120°.

From curve 94 it will be observed that the heat rate remains substantially constant from 16.6 MW to 8.8 MW at 0°F ambient temperature with the compressor section inlet temperature varying from 0°F to +120°F as tempered by the recirculated stack gas. At higher ambient temperatures, the performance curves follow curve 94 closely, but terminate at their right-hand ends at lower net output levels.

With recirculation of stack gas, it will be apparent that greatly improved performance is available under partial load conditions. In accordance with this invention, because it is the stack gas which is recirculated, full advantage is taken of the heat of the gas turbine exhaust. With the system as described, the inlet air filter will not freeze even under low ambient air conditions, because ambient air is adequately heated by the recirculated stack gas before reaching the filter. In addition, control of the turbine compressor inlet temperature is easily maintained by the controlled damper regulating flow of stack gas.

I claim:

1. A combined steam turbine-gas turbine power plant comprising:

a gas turbine having in series a compressor section, a combustion chamber, and a turbine section discharging hot exhaust gases, a steam generator comprising means for containing water, means for conducting the heat from said hot exhaust gases to the water in said containing means, and outlet means for said exhaust gases following said conducting means, a steam turbine receiving steam from said steam generator, and means for introducing at least part of the exhaust gases from said outlet means into the compressor section including means for combining said exhaust gases with ambient air, and means responsive to the temperature of the gas-air mixture entering the compressor section for regulating the flow of exhaust gases into said combining means and thereby regulating the temperature of the gas-air mixture.

2. A power plant according to claim 1 in which said means for introducing at least part of the exhaust gases into the compressor section comprises filtering means between said combining means and said compressor section.

3. A power plant according to claim 1 in which said outlet comprises a stack for receiving the exhaust gases discharged from said conducting means and exhausting said gases to the atmosphere, means for producing a back-pressure in said stack, and means communicating with said stack for delivering at least part of the exhaust gases in said stack to said compressor section under the influence of said back-pressure.

4. A combined steam turbine-gas turbine power plant comprising:

a gas turbine having in series a compressor section, a combustion chamber, and a turbine section discharging hot exhaust gases, a steam generator comprising means for containing water, means for conducting the heat from said hot exhaust gases to the water in said containing means, and outlet means for said exhaust gases following said conducting means, a steam turbine receiving steam from said steam generator, and means for introducing at least part of the exhaust gases from said outlet means into the compressor section, said outlet means comprising a stack for receiving the exhaust gases discharged from said conducting means and exhausting said gases to the atmosphere, an adjustable damper for producing a back-pressure in said stack, and means communicating with said stack for delivering at least part of the exhaust gases in said stack to said compressor section under the influence of said back-pressure.

5. A combined steam turbine-gas turbine power plant comprising:

A gas turbine having in series a compressor section, a combustion chamber, and a turbine section discharging hot exhaust gases, a steam generator comprising means for containing water, means for conducting the heat from said exhaust gases to the water in said containing means, a steam turbine receiving steam from said steam generator, a stack for receiving exhaust gases from said turbine section and from said conducting means, means establishing a path for flow of atmospheric air into said compressor section, filtering means in said path, means preceding said filtering means in said path for combining exhaust gases from said stack with the atmospheric air entering the compressor section through said filtering means, means for producing a back-pressure in said stack, means communicating with said stack for delivering at least part of the exhaust gases in said stack to said combining means under the influence of said back-pressure, means responsive to the temperature of the gas-air mixture entering the compressor section for regulating the flow of exhaust gases into said combining means and thereby regulating the temperature of the gas-air mixture.

* * * * *